United States Patent
Huitema et al.

(10) Patent No.: US 10,535,325 B2
(45) Date of Patent: Jan. 14, 2020

(54) LOW POWER DISPLAY UPDATES

(71) Applicant: FLEXTERRA, INC., Skokie, IL (US)

(72) Inventors: Hjalmar Edzer Ayco Huitema, Belmont, CA (US); Justin Baum, San Francisco, CA (US); Aubrey Anderson, Berkeley, CA (US)

(73) Assignee: FLEXTERRA, INC., Skokie, IL (US)

( * ) Notice: Subject to any disclaimer, the term of this patent is extended or adjusted under 35 U.S.C. 154(b) by 0 days.

(21) Appl. No.: 15/361,500

(22) Filed: Nov. 28, 2016

(65) Prior Publication Data
US 2017/0236497 A1   Aug. 17, 2017

Related U.S. Application Data

(63) Continuation of application No. PCT/US2015/030724, filed on May 14, 2015.

(60) Provisional application No. 62/004,001, filed on May 28, 2014.

(51) Int. Cl.
*G09G 5/393* (2006.01)
*G04G 9/00* (2006.01)
*G04G 21/08* (2010.01)
*G06F 3/0488* (2013.01)

(52) U.S. Cl.
CPC ............ *G09G 5/393* (2013.01); *G04G 9/007* (2013.01); *G04G 21/08* (2013.01); *G06F 3/0488* (2013.01); *G09G 2310/08* (2013.01); *G09G 2330/021* (2013.01); *G09G 2330/023* (2013.01); *G09G 2354/00* (2013.01); *G09G 2360/08* (2013.01); *G09G 2360/18* (2013.01); *G09G 2370/20* (2013.01); *G09G 2380/02* (2013.01)

(58) Field of Classification Search
CPC ....................................................... G06F 1/3203
USPC ........................................................ 345/501
See application file for complete search history.

(56) References Cited

U.S. PATENT DOCUMENTS

| | | | |
|---|---|---|---|
| 5,707,745 A | 1/1998 | Forrest et al. | |
| 5,844,363 A | 12/1998 | Gu et al. | |
| 5,930,026 A | 7/1999 | Jacobson et al. | |
| 6,097,147 A | 8/2000 | Baldo et al. | |
| 6,097,399 A * | 8/2000 | Bhatt | G09G 1/162 345/440 |
| 6,212,133 B1 | 4/2001 | McCoy et al. | |
| 6,303,238 B1 | 10/2001 | Thompson et al. | |
| 6,585,914 B2 | 7/2003 | Marks et al. | |

(Continued)

OTHER PUBLICATIONS

International Search Report and Written Opinion for Application No. PCT/US2015/030724, dated Aug. 14, 2015.

(Continued)

*Primary Examiner* — Phong X Nguyen
(74) *Attorney, Agent, or Firm* — Marshall, Gerstein & Borun LLP

(57) ABSTRACT

A method for updating images displayed on an electronic display of a mobile device includes determining a time interval between successive updates of an image frame. The image frame is displayed on the electronic display, and the mobile device is configured to be in a low power mode between the successive updates. The method also includes receiving one or more application updates within the time interval after a first update of the image frame, and updating the image frame after the time interval based on the one or more application updates.

20 Claims, 8 Drawing Sheets

(56) References Cited

U.S. PATENT DOCUMENTS

| | | |
|---|---|---|
| 6,608,323 B2 | 8/2003 | Marks et al. |
| 6,831,769 B2 | 12/2004 | Holman et al. |
| 6,839,158 B2 | 1/2005 | Albert et al. |
| 6,991,749 B2 | 1/2006 | Marks et al. |
| 7,170,670 B2 | 1/2007 | Webber |
| 7,374,702 B2 | 5/2008 | Marks et al. |
| 7,446,945 B2 | 11/2008 | Kuiper et al. |
| 7,528,176 B2 | 5/2009 | Marks et al. |
| 7,569,693 B2 | 8/2009 | Marks et al. |
| 7,605,225 B2 | 10/2009 | Marks et al. |
| 7,605,394 B2 | 10/2009 | Marks et al. |
| 7,671,202 B2 | 3/2010 | Marks et al. |
| 7,816,480 B2 | 10/2010 | Marks et al. |
| 7,842,198 B2 | 11/2010 | Marks et al. |
| 7,892,454 B2 | 2/2011 | Facchetti et al. |
| 7,893,265 B2 | 2/2011 | Facchetti et al. |
| 7,902,363 B2 | 3/2011 | Facchetti et al. |
| 7,947,837 B2 | 5/2011 | Marks et al. |
| 7,981,989 B2 | 7/2011 | Yan et al. |
| 7,982,039 B2 | 7/2011 | Marks et al. |
| 8,017,458 B2 | 9/2011 | Marks et al. |
| 8,022,214 B2 | 9/2011 | Facchetti et al. |
| 8,093,588 B2 | 1/2012 | Marks et al. |
| 8,097,877 B2 | 1/2012 | Marks et al. |
| 8,111,465 B2 | 2/2012 | Heikenfeld et al. |
| 8,207,977 B1* | 6/2012 | Kumar ............... G09G 5/36 345/501 |
| 8,274,075 B2 | 9/2012 | Marks et al. |
| 8,329,855 B2 | 12/2012 | Usta et al. |
| 8,334,545 B2 | 12/2012 | Levermore et al. |
| 8,338,555 B2 | 12/2012 | Yan et al. |
| 8,395,150 B2 | 3/2013 | Marks et al. |
| 8,404,844 B2 | 3/2013 | Kastler et al. |
| 8,440,828 B2 | 5/2013 | Quinn et al. |
| 8,542,221 B1* | 9/2013 | Wyatt ............... G06F 15/00 345/204 |
| 2003/0197597 A1 | 10/2003 | Bahl et al. |
| 2005/0083339 A1* | 4/2005 | Wilt ............... G09G 5/14 345/539 |
| 2006/0020469 A1 | 1/2006 | Rast |
| 2006/0066595 A1* | 3/2006 | Sampsell ............... G09G 3/3466 345/204 |
| 2006/0066601 A1* | 3/2006 | Kothari ............... G02B 26/001 345/204 |
| 2006/0146056 A1* | 7/2006 | Wyatt ............... G09G 5/006 345/501 |
| 2006/0192775 A1* | 8/2006 | Nicholson ............... A61F 4/00 345/211 |
| 2008/0100636 A1 | 5/2008 | Lai et al. |
| 2010/0060566 A1* | 3/2010 | Wang ............... G09G 3/34 345/107 |
| 2010/0252112 A1 | 10/2010 | Watson |
| 2010/0277429 A1* | 11/2010 | Day ............... G06F 3/0416 345/173 |
| 2010/0283047 A1 | 11/2010 | Facchetti et al. |
| 2010/0326527 A1 | 12/2010 | Facchetti et al. |
| 2011/0124375 A1* | 5/2011 | Stuivenwold ............... G06F 1/3203 455/566 |
| 2011/0175089 A1 | 7/2011 | Zheng et al. |
| 2011/0202843 A1* | 8/2011 | Morris ............... G06F 3/013 715/716 |
| 2011/0215334 A1 | 9/2011 | Quinn et al. |
| 2012/0068314 A1 | 3/2012 | Kastler et al. |
| 2012/0223314 A1 | 9/2012 | Marks et al. |
| 2013/0054997 A1 | 2/2013 | Wyatt et al. |
| 2013/0062598 A1 | 3/2013 | Usta et al. |
| 2013/0141642 A1* | 6/2013 | Wu ............... G06F 3/1407 348/441 |
| 2013/0194195 A1* | 8/2013 | Parekh ............... G06F 3/0416 345/173 |
| 2013/0219332 A1* | 8/2013 | Woley ............... G06F 1/3209 715/808 |
| 2013/0222208 A1 | 8/2013 | Gorilovsky et al. |
| 2014/0022234 A1* | 1/2014 | Ogawa ............... G06F 1/3265 345/213 |
| 2014/0035761 A1* | 2/2014 | Burton ............... G01D 4/002 340/870.02 |
| 2014/0039804 A1* | 2/2014 | Park ............... A61B 5/0002 702/19 |
| 2014/0051485 A1* | 2/2014 | Wang ............... H04W 4/70 455/574 |
| 2014/0092150 A1* | 4/2014 | Slavenburg ............... G09G 5/001 345/698 |
| 2014/0104243 A1* | 4/2014 | Sakariya ............... G06F 3/14 345/204 |
| 2014/0267015 A1* | 9/2014 | Saatchi ............... G09G 5/006 345/156 |
| 2014/0340384 A1* | 11/2014 | Chang ............... G06F 1/3218 345/212 |
| 2015/0033047 A1* | 1/2015 | Byun ............... G06F 1/3206 713/320 |
| 2015/0084892 A1 | 3/2015 | Shirota et al. |
| 2015/0100802 A1* | 4/2015 | Thomas ............... G06F 1/3218 713/320 |
| 2015/0116296 A1* | 4/2015 | Greene ............... H04B 5/0037 345/211 |
| 2015/0172590 A1* | 6/2015 | Wang ............... G09G 5/393 345/545 |

OTHER PUBLICATIONS

International Preliminary Report on Patentability for Application No. PCT/US2015/030724, dated Nov. 29, 2016.

* cited by examiner

LOW POWER DISPLAY UPDATES

CROSS-REFERENCE TO RELATED APPLICATIONS

This is a continuation of International Application No. PCT/US15/30724, filed on May 14, 2015, which claims priority and the benefit of the filing date of U.S. Provisional Patent Application Ser. No. 62/004,001 and filed on May 28, 2014. The entire disclosure of each of these applications is hereby expressly incorporated by reference herein for all uses and purposes.

TECHNICAL FIELD

This patent application relates generally to electronics displays for mobile devices, and more particularly, to methods for updating content displayed on electronics displays of mobile devices.

BACKGROUND

Mobile devices, such as smartphones, tablet computers, etc., typically execute multiple processes during operation. Such processes include locally executed applications (e.g., text messaging, calendar, email, web browser, etc. applications), processes triggered by user interactions (e.g., graphical user interface navigation), and processes triggered by communications (e.g., phone calls). Often these processes generate content for presentation on an electronic display in an asynchronous manner, such as writing content to a frame buffer of a graphics card up to fifty times per second.

This asynchronous updating of displayed content is impractical for many wearable devices, such as smartwatches, head-mounted devices, etc., because of the amount of power required. That is, an asynchronous updating of displayed content requires a device to remain in a high-power mode so that displayed content can be updated as updates are received. Such a requirement can drastically reduce the battery life of devices. Further, devices employing a multi-stable displays (e.g., electrophoretic e-paper displays) are unable to utilize asynchronous updates. In fact, many multi-stable displays are capable of performing only a finite number of image updates during a lifetime of operation, and, as such, even if they could be implemented, asynchronous or near continuous updates would drastically reduce the lifetime of such devices.

SUMMARY

In an embodiment, a computer-implemented method for updating images displayed on an electronic display of a mobile device comprises determining, by one or more processors, a time interval between successive updates of an image frame. The image frame is displayed on the electronic display, and the mobile device is configured to be in a low power mode between the successive updates. The method further comprises receiving, from a plurality of applications executing on the one or more processors, one or more application updates within the time interval after a first update of the image frame, and updating, by the one or more processors, the image frame after the time interval based on the one or more application updates.

In another embodiment, a non-transitory computer-readable medium stores thereon instructions that, when executed on one or more processors of a computing device, cause the one or more processors to determine a time interval between successive updates of an image frame. The image frame is displayed on the electronic display, and the mobile device is configured to be in a low power mode between the successive updates. Further, the instructions cause the one or more processors to receive, from a plurality of applications executing on the one or more processors, one or more application updates within the time interval after a first update of the image frame, and update the image frame after the time interval based on the one or more application updates.

In yet another embodiment, a computing device comprises a rendering module and a non-transitory computer-readable memory. The non-transitory computer-readable memory stores thereon instructions that, when executed by the rendering module, cause the computing device to determine a time interval between successive updates of an image frame. The image frame is displayed on the electronic display, and the mobile device is configured to be in a low power mode between the successive updates. Further, the instructions cause the computing device to receive, from a plurality of applications executing on the one or more processors, one or more application updates within the time interval after a first update of the image frame, and update the image frame after the time interval based on the one or more application updates.

DETAILED DESCRIPTION

An updating scheme allows applications or processes executing on a mobile device (e.g., a wearable mobile device) to change/update displayed content while: (i) controlling or minimizing power consumption; (ii) controlling or minimizing a number of displayed content updates; and/or (iii) clearly defining times at which the displayed content is updated. Applications or processes executing on the mobile device generate updates to an image frame (e.g., a currently displayed image on an electronic display of the mobile device), and the image frame is changed based on the updates only at clearly defined time intervals. In between updates/changes to the image frame (i.e., during the time intervals) the mobile device may be operating in a low-power mode.

A wearable computing or communication device or wearable article, such as a smartwatch, may implement the updating scheme to control image updates on an electronic display and/or to regulate power consumption. For example, a flexible wristband or smartwatch implementing the updating scheme (e.g., in an electronics module or operating system) along with a flexible display component may display and allow a user to interact with images, data, maps, calendars, social media information, etc., while regulating power consumption and controlling updates of displayed content. Generally, it is understood that image/display updating schemes, methods, modules, etc., discussed herein may be implemented in the software and/or hardware of any type of wearable or non-wearable computing, communication, or other mobile device.

System Overview

Figure 1:
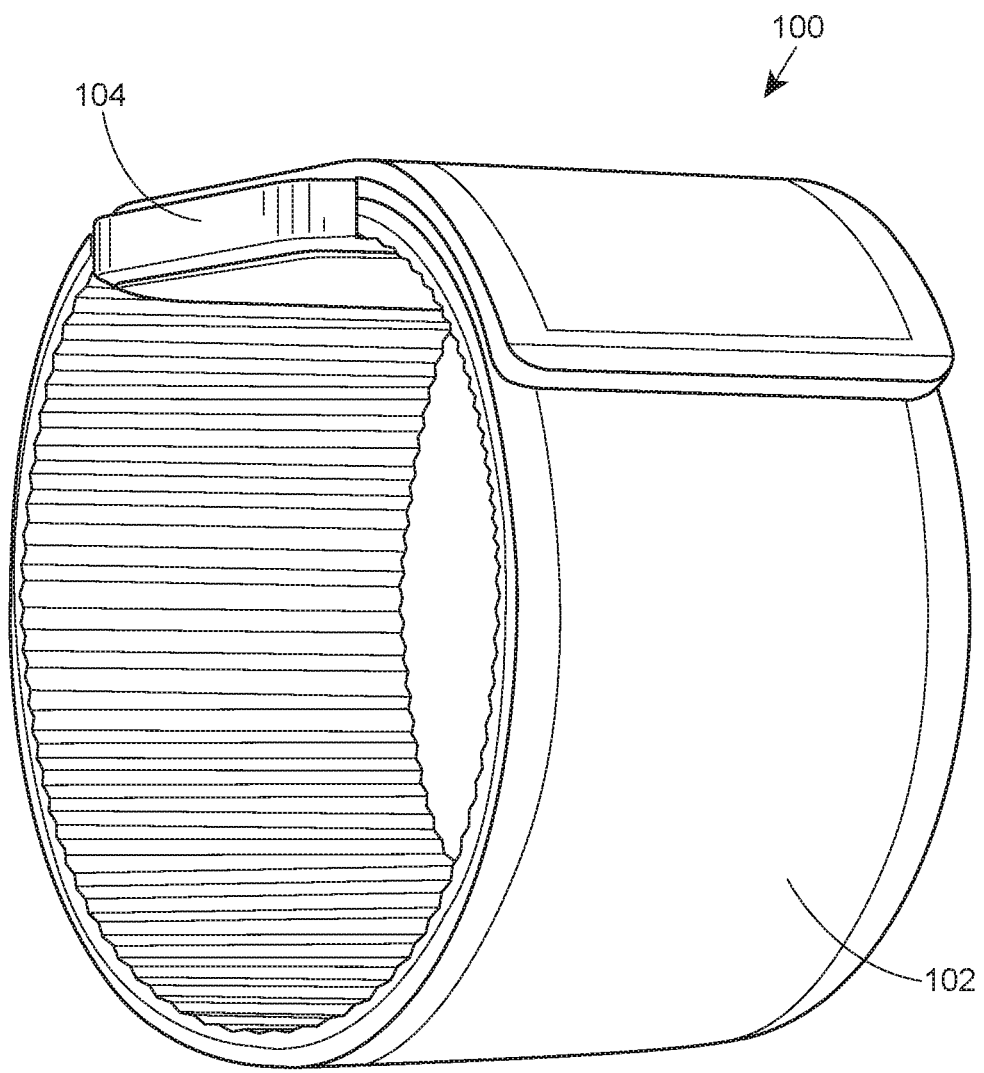
FIG. 1 is a perspective view of an example article in which image frame updates may be controlled or minimized.

FIG. 1 illustrates an example flexible, attachable article 100, such as a smartwatch or bracelet-type computing or communication device which may implement an image frame updating scheme. Content, such as images, data, maps, calendars, social media information, etc., may be displayed on a flexible display at or near a top surface 102 of the article 100. The article may also include the touch interface (not shown) to allow a user to interact with the flexible display by touching the surface 102. Further details of the example article 100 are described with reference to FIG. 2.

In some implementations, the article 100 may utilize a flexible display as described in U.S. Provisional Patent Application No. 61/946,412, filed Feb. 28, 2014, and entitled "SUPPORT STRUCTURE FOR A FLEXIBLE DISPLAY COMPONENT," a touchscreen interface as described in U.S. Provisional Patent Application No. 61/981,132, filed Apr. 17, 2014, and entitled "INFRARED TOUCH SYSTEM FOR FLEXIBLE DISPLAYS," and/or a support structure component as described in U.S. Provisional Patent Application No. 61/946,412, filed Feb. 28, 2014, and entitled "SUPPORT STRUCTURE FOR A FLEXIBLE DISPLAY COMPONENT," the disclosures of which are hereby expressly incorporated by reference herein. Further, a support structure component, flexible display component, and one or more interlayers of the article 100 may be assembled, or adhered together, to form the article 100 using some or all of the mounting techniques described in U.S. Provisional Patent Application 61/971,100, filed March 27 and entitled "OPTIMAL MOUNTING OF A FLEXIBLE DISPLAY," the disclosure of which is hereby expressly incorporated by reference herein.

The article 100 may include an electronics module 104 disposed between one or more ends of the surface 102 and holds electronics, such as processors, memories, sensors, batteries, display drivers, etc. that are used to power and drive the touch interface and the flexible display and to implement an updating scheme for displayed content on the article 100. It will be appreciated that the electronics module 104 can be positioned elsewhere in other examples, such as, for example, at other locations on the surface 102. If desired, the components of the electronics module 104 can be sealed or otherwise protected from water, air, dirt, etc. to which the exterior of the article 100 is exposed. For example, any or all of these electronic components may be encapsulated in a hermetically sealed manner to prevent any direct exposure of these components to exterior forces and environmental hazards.

Figure 2:
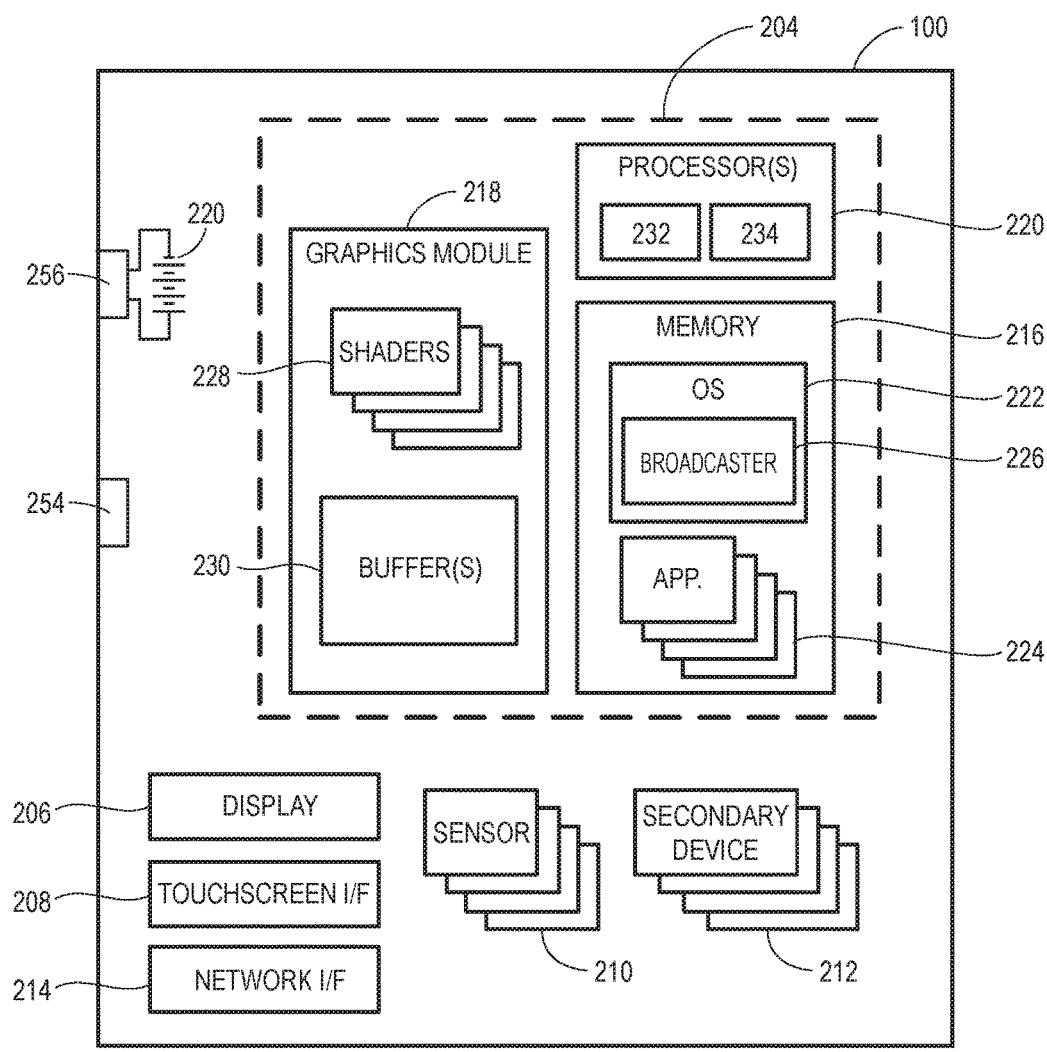
FIG. 2 is a block diagram of the example article illustrated in FIG. 1.

FIG. 2 is a block diagram illustrating further details of the example article 100. Some or all of the components illustrated in FIG. 2 may be sealed or packaged in the electronics module 104, as discussed with reference to FIG. 1. However, in general, the components illustrated in FIG. 2 may be disposed at any location on or in the example article 100 while remaining in communicative connection with the remainder of the components of the article 100 (e.g., via a wired or wireless connection). In particular, the example article 100 includes a battery 202 that powers a number of other modules or electronic components including a rendering module 204, a display 206 (e.g., a flexible display component), a touch screen interface 208, a number of sensors 210, other secondary devices 212, and a network interface 214.

The rendering module 204 may include a computer readable memory 216, which may be, for example, a flash memory or other suitable type of non-transitory, tangible, data storage medium, a graphics module 218, and one or more general-purpose processors 220. Any combination of the components of the rendering module 204 and/or other components of the article 100 may implement the updating schemes discussed herein. For example, an operating system 222 and/or one or more applications 224 stored in the memory 216 and executed by the processors 220 may synchronize content updates from the one or more applications 224, generate updates for an image frame, broadcast (e.g., by a broadcaster 226 of the operating system 222) update or time interval notifications, etc. On the other hand, the operating system 222 and applications 224 may cooperate with the graphics module 218 (e.g., a graphic card or display driver implementing a graphics pipeline as known in the industry) to generate updates for an image frame, bind data (e.g., vertex data for vector images) into one or more shaders 228 (e.g., vertex/fragment shaders) of the graphics module 218, update one or more buffers 230 (e.g., a frame buffer), cause the updated and rendered image frame to be displayed on the display 206, etc.

The sensors 210 may include, for example, an impact sensor or step counter, one or more gyroscopic sensors or gyroscopes, temperature sensors, vibration sensors, pulse rate monitors, pressure sensors, strain gauges, etc. For example, the sensors 210 may include any number of any number of types of sensors, such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and piezoelectric sensors, to name a few. The secondary electronic devices 212 may include, for example, an alarm or noise creation device, a speaker, a microphone, a vibrator the operation of which causes the electronics module 200 to vibrate, etc.

As will be understood, the memory 216, the network interface 214, the graphics module 218, the display 206, and the touch screen interface 208, as well as the sensors 210 and other secondary electronic devices 212, are communicatively connected to the processors 220 and may operate to perform various functions in conjunction with the applications 224 or other programs implemented by the processors 220. Still further, each of these elements may be connected to and powered by the battery 202 in any known or desired manner.

The article 100 of FIGS. 1 and 2 may also include one or more communication ports, such as communication port 254 (e.g., a USB or other type of digital communication port) and a power or battery charger or power input port 256. In this case, the power input port 256 may be connected to the battery 202 and enable charging or recharging of the battery 202 using any known or desired recharging circuitry and methodology. Alternatively or in addition, the communications input port 254 (in the form of for example, a USB input port) may be connected to the battery 202 and provide power to the battery 202 for charging battery 202, and the input port 254 may also be connected to the processors 220, as well as to the network interface 214, for performing wired-based communications via the input port 254. Of course, the communication input port 254, while being illustrated as a USB-type connection, could any other type of known wired or physical communication connection, including any desired serial or parallel digital communication port using any number of pins or wires, as is known in the art, an analog communication port, etc. Additionally or alternatively, the input port 254 may include a wireless input port for performing wireless communications.

In an embodiment, the power input port 256 may be a wireless input port for powering the article 100, and in this case may, for example, be part of a battery charger unit that operates to charge the battery 202 using, for example, an inductively coupled charging technique. If the battery charger unit is part of an inductively coupled charging system, it generally responds to electromagnetic waves produced by an exterior charging unit (not shown) to charge the battery 202 when the attachable article 100 is disposed near the external charging unit. In another case, the battery charger of the input port 256 may be a kinetic energy charger unit that converts motion of the article 100 (such as that associated with movement of an arm when the attachable electronic article 100 is in the form of a wristband) into electrical energy which is provided to charge the battery 202.

As will be understood, the processors 220, which may include programmable, general-purpose processors or specially programmed processors, may, along with the graphics module 218 (which may include one or more graphics processing units), coordinate and implement the operation of the display 206 and the associated electronic components as described in more detail herein. The computer readable memory 216 stores the operating system 222 implemented by the processors 242, and the various applications 224 to be run on the processors 220 to implement various different types of functionality via the article 100, some of which will be described in more detail herein. The memory 216 may also store one or more data files (not shown), which may be, for example, image or video data files associated with various images to be displayed on the display 206 at various different times. Still further, the memory 216 may store application data (not shown) that may be created by the various applications 224 or the processors 220 as part of the operation of various applications 224 and to be used by those applications 224 either during runtime of the applications 224 or at other times. If desired, the processors 220 or one of the secondary electronic components 253 may include or be a clock that tracks the current time, day, date, month, year, time zone, etc.

As an example, one or more of the applications 224 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 224 may operate on the processors 220 to turn the display 206 into a slave display device that may be tied to or communicably coupled to an exterior master device that is generating content to be displayed via the display 206. The master device, which may be a smart phone or a nearby computer device, may be wirelessly connected to the article 100 to provide content to be displayed on the display 206 and will typically have more memory, and computing and processing power than the article 100.

In some implementations, the processors 220 may include one or more main or primary processors 232 and one or more co-processors 234. For example, the main processor 232 may have superior computational ability as compared with the co-processor 234, but the co-processor may consume much less power to operate as compared with the main processor 232. As discussed herein, image frames, displayed on the display 206, may only be updated at certain times. Between these updates, the article may operate in a low power state or mode. For example, between image frame updates the main processor 232 may be put (e.g., by the operating system 222) into a sleep, hibernation, or other non-active state while the (low-power) co-processor 234 performs any remaining tasks, such as listening to or polling for user interaction (e.g., via the touchscreen interface 208) or incoming notifications (e.g., via the network interface 214).

The network interface 214 of FIG. 2 may include or use any type of communication hardware/software/firmware that uses any desired types of communication techniques to enable the processors 220 to communicate with exterior devices or sources. Of course, the network interface 214 could include multiple different types of communication hardware/software/firmware, including any kind of hardwire-based communication module or wireless-based communication module. As examples, the network interface 214 may be a wired or wireless Internet-based communication module that may provide wired or wireless-based, IP protocol communications between the dynamically flexible, attachable article or article 100 and other devices or a communication network such as a LAN or a WAN to which other devices are communicatively connected. Likewise, the network interface 214 may include a near field communications (NFC) module, a radio frequency identification (RFID) communications module for communicating with, sending messages to and/or receiving messages from RFID tags stored in other devices around or close to the article 100. In this case, the network interface 214 may decode signals received from RFID tags in response to pings to identify the RFID tags or tag numbers (identifiers) associated with these devices. Likewise, the network interface 214 may be a near field communication (NFC) module or a Bluetooth communication module, which may perform near field communications or Bluetooth communications in any known or desired manner with nearby NFC or Bluetooth enabled devices, thereby enabling wireless communication between the article 100 and other closely situated or closely located electronic devices. Still further, the network interface 214 may include a USB or other type of wired communication module for decoding and encoding USB-based communication signals to be sent out and received via the USB communication port 254.

The graphics module 218 may be coupled to the processors 220 and to the display 206 to "drive" the display 206 to present different images to a user and thus implement functionality via the display 206. The graphics module 218 may be associated with or use any type of display driver technology associated with the various different types of flexible displays that might be used, including, for example, e-ink or other bi-stable display drivers, organic light emitting diode (OLED) display drivers, etc. Of course, it will be understood that the graphics module 218 is connected to the various pixel elements or pixels of the display 206 to cause the pixel elements to change their visual appearance so as to present content image on the display 206. Typically, but not necessarily, each pixel element is communicatively connected to two electrodes, lead lines, connecting lines, or connectors corresponding the (x, y) coordinates of the particular pixel element on the display 206. Thus, the graphics module 218 provides image content (e.g., by using electrical signals or other suitable signals) to a set of connecting lines corresponding to a width of the display 206 or its display area (and, in some cases, physically emanating from a width edge or transverse side of the display 206 to the graphics module 218), and the same graphics module 218 may provide image content (e.g., by using electrical signals or other suitable signals) to another set of connecting lines corresponding to a length of the display 206 (and, in some cases, physically emanating from a length edge or longitudinal side of the display 206 to connect to the graphics module 218). In an example, the graphics module 218 provides image content to a set of transverse connecting lines and/or to a set of longitudinal connecting lines so that image content is presented on the display area of the flexible display. In an implementation, the article 100 includes multiple graphics modules, each of which provides image content to a respective set of connecting lines, or a single graphics module with multiple graphics processing units thereon.

To render images for display on the display 206, the graphics module 218 can utilize a hardware graphics renderer in a GPU, that implements various shading stages (of a "graphics pipeline") performed by the shaders 228. The shaders 228 may operate on vertices, which describe polygons drawn in a "frame buffer." For example, the applications 224 or the operating system 222, being executed by the processors 220 may create a collection of triangles (made up of points) and pass the collection of triangles to the graphics module 218. For each triangle in the collection, the graphics module 218 then may execute one of the shaders 228 on each vertex of the triangle and/or a shader on each pixel enclosed by the triangle. Generally speaking, to render an image frame of information for display on the display 206, the graphics module 218 may: (i) clear the region in the buffers 230 for storing bitmaps, known as a framebuffer, and (ii) prepare vertex and texture data, set a state of a graphics pipeline, and execute a draw function for each object in the rendered image frame.

The graphics module 218, and/or other components of the article 100, may illuminate or cause the pixel elements to obtain or reach a color, a lighting level, an on-off state, etc., so as to drive the display 206 to present a rendered image frame and perform other functionality as determined by the particular application 224 being executed on the processors 220. In some cases, the graphics module 218 may cause various images, such as one or more artistic renditions, patterns, etc. or other types of images stored in the memory 216 to be displayed on the display 206. Such an image may be any type of graphic element in the form of artwork, an indication of an association of the user with a particular university or other organization, such as a logo, a mascot, an icon, etc. In the case of a static display, and particularly when the display 206 is a bi-stable type of flexible display, such as an e-ink type of display, the display 206 might display a particular image or background image whenever the article 100 is in a sleep mode, and thus in which the graphics module 218 is not operating to actively drive the display 206.

The touchscreen interface 208 may is receives input signals from and send output signals to the rendering module 204. The rendering module 204 (e.g., the operating system 222 or other process being executed by the processors 220) operates to decode these input signals to identify touch events that occur with respect to the touchscreen interface 208. The rendering module 204 operates to energize and control the touchscreen interface 208, as well as to recognize and decode touch screen events to identify, for example, the location of each touch screen event, a type of a touch screen event, such as a tap or a swipe movement, etc. If desired, the rendering module 204 may operate to determine or recognize gestures that are input via the touchscreen interface 208, such gestures being, for example, a slide, a squeeze, a swipe, a multi-finger pinch or any other type of gesture that includes one or more finger movements coordinated with one another. Each such gesture may indicate an action to be taken on or via the article 1000.

Generally, the dynamically flexible, attachable article or article 1000 may include other or different types of user input devices configured to detect user-generated gestures, such as interfaces that include buttons switches, roller balls, slide bars, pressure sensors, strain gauges, etc. Such user interfaces may enable the user to perform more rudimentary functions, such as scrolling movements, on-off powering movements, mode switching, etc. that are traditionally entered via actuate-able buttons or switches.

As previously discussed, the sensors 210 may include any of various different types of sensors. In an embodiment, the sensors 210 include one or more gyroscopes which detect movement of or the orientation of the article 100, rapid shaking of the article 100, etc. One or more of these types of movements may be considered to be a particular type of input or user input, such as a gesture to reset the article 100, to change a power mode of the article 100, etc. Likewise, the output of such gyroscopes can be used by the processors 220 to determine the orientation or direction of the display 206 to enable the processors 220, or an application 224 executed on the processors 220, to determine the proper orientation of the image to be displayed on the display 206. In some instances, such motion detection and position detection devices might be located in fasteners of the articles 100 or the electronics module 104, to enable the article 100 to more accurately determine whether the article 100 is oriented around a wrist or other circular member or whether it is instead laid out flat or oriented in some other manner. The processors 220 or an application executed thereon may change functionality, behavior, and/or actions of the article 100 based on a detected orientation. Moreover, the processors 220 may change an updating scheme of image frames, such as time intervals between updates, based on a detected orientation or a detected type of movement.

In some cases, the sensors 210 include one or more pressure or force sensors and/or strain gauges which detect pressure, strain, or similar forces that are considered to be an input to cause the functionality, behavior, and/or actions of the article 100 to change, e.g., reset the article 100, change a power mode of the article 100, change a presentation displayed on the display 206 of the article 100, etc. In one example, two pressure or force sensors are positioned on or attached to the article 100 (e.g., as part of a backplane of a flexible display or as part of the support structure component) so that when the article 100 is attached to itself in a generally circular or looped configuration, the pressure or force sensors are diametrically opposed to each other.

The touchscreen interface 208 and the display 206 may be dynamically bendable or conformable to a surface, object, or device, though in other embodiments the display 206 can be a collapsible e-reader, roll-out screen, OLED light, or other electronic component. The display 206 may be manufactured as any type of flexible display, such as an e-paper display, an organic light-emitting diode (OLED) display, etc., further details of which are discussed with reference to FIGS. 8A, 8B, and 8C and described in commonly owned U.S. Provisional Patent Application 61/920,705, filed Dec. 24, 2013 and entitled "DYNAMICALLY FLEXIBLE, ATTACHABLE DEVICE HAVING AN INTEGRAL FLEXIBLE DISPLAY," the disclosure of which is hereby expressly incorporated by reference herein.

Updating Displayed Content

FIGS. 3, 4, 5, and 6 illustrate flows of communication during the updating of an image frame displayed on a display, such as the display 206. As illustrated in FIGS. 3, 4, 5, and 6 the communications may be generated by and/or received by applications, an operating system, and a graphics module of an article, such as article 100. However, in some implementations, both components of an article and components of devices separate from an article may generate and/or receive the communications illustrated in FIGS. 3, 4, 5, and 6. For example, a smartphone communicatively connected (e.g., via Bluetooth) to an article, such as article 100, may generate updates from an application executing on the smartphone and communicate those updates to the article 100 for display.

Figure 3:
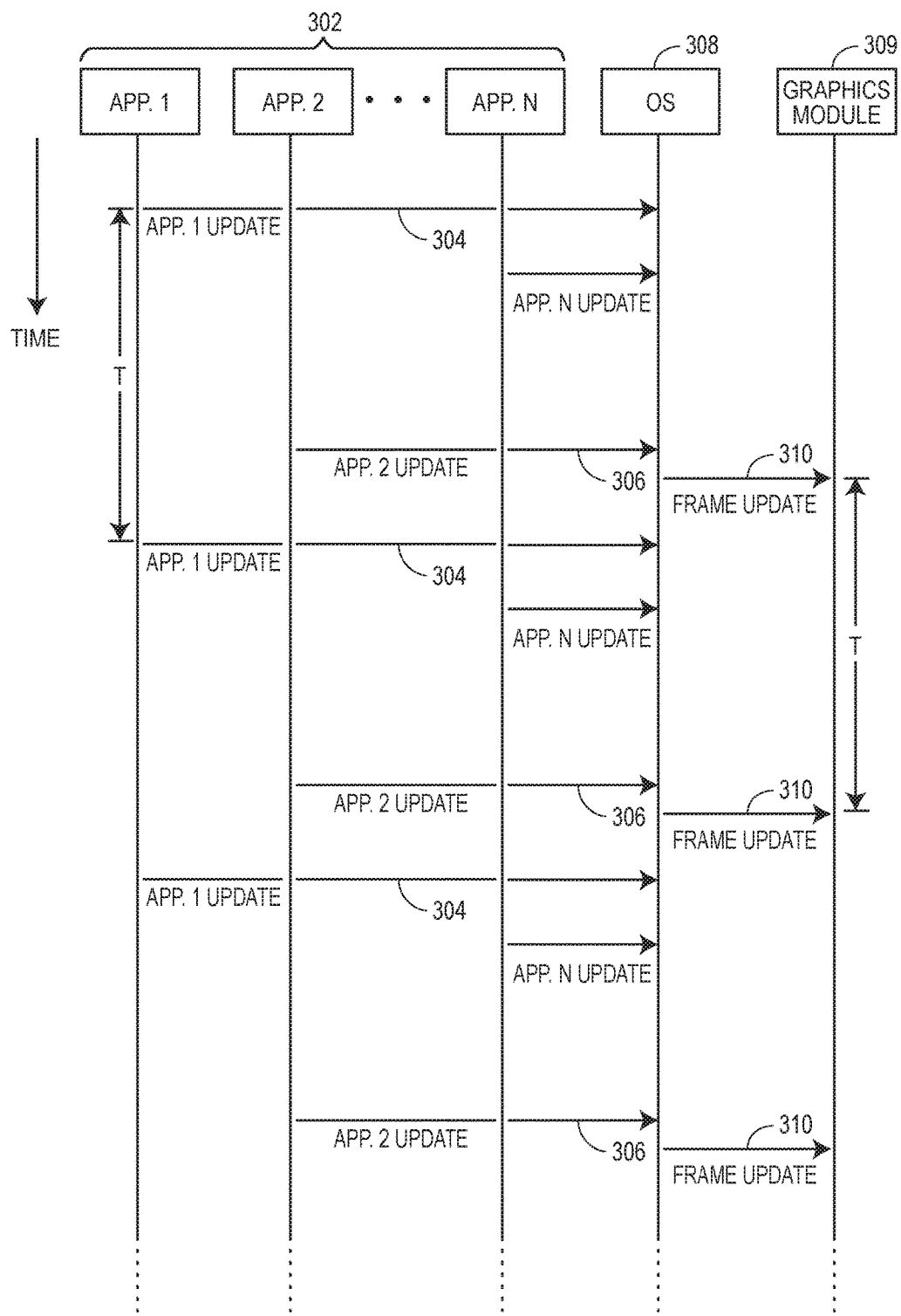
FIG. 3 is a communication flow illustrating an example scheme for updating an image frame displayed on an article, such as the article illustrated in FIG. 1.

In particular, FIG. 3 illustrates an example communication flow in which components of an article, such as the article 100, update an image frame displayed on the article at clearly defined time intervals. Each of one or more applications 302 (e.g., executed by the processors 220) may include a design rule which causes the one or more applications 302 to generate and communicate timed updates for displayed content. For example, in the implementation of FIG. 3, the timed updates may be periodic with a period "T" (e.g., twenty, fifty, one hundred, five hundred milliseconds, one second, or one minute) such that the one or more applications 302 generate/communicate updates to displayed content every "T" seconds.

In one scenario, one of the applications 302 (e.g., "App. 1" or "Application 1") may be a weather reporting application. When executed on an article, such as the article 100, Application 1 may generate a current temperature that is to be displayed on the display 206 in a format defined by Application 1. Although, Application 1 may receive and/or generate updated temperatures near continuously, Application 1 may be programmed or designed such that Application 1 only generates an updated temperature for display on the article 100 every "T" seconds (as illustrated in FIG. 3 by arrows 304). Similarly, another of the applications 302 (e.g., "App. 2" or "Application 2") may be a news reporting application. When executed on an article, such as the article 100, Application 2 may generate a text description of current new stories that are to be displayed on the display 206 in a certain format defined by Application 2. Similar to Application 1, Application 2 may be programmed or designed such that Application 2 only generates updated news descriptions for display on the article 100 every "T" seconds (as illustrated in FIG. 3 by arrows 306). In fact, all of the applications 302 executing on the article 100 may designed so as to generate updated content for display at certain pre-defined times.

Although each of the applications 302 may be designed or programmed such that they generate/communicate content updates every "T" seconds, updates from one or more of the applications 302 may not be synchronized such that they are communicated or generated at the same time, in some scenarios. As such, each of the application 302 may communicate updates to an operating system 308 or other suitable program, module, or process being executed on an article. Subsequently, the operating system 308 or other process may aggregate or assemble updates from the application 302, received after a previous update to an image frame, into a single image frame update that is communicated to a graphics module 309 every "T" seconds. In this manner, the graphics module 309 may update a frame buffer (e.g., render an image including updated content from the applications 302) only at time intervals defined by the period "T" (as illustrated by arrows 310 in FIG. 3). In between these image frame updates, the article 100 implementing the communication flow illustrated in FIG. 3 may be in a low-power mode, such as a mode in which a main processor is hibernating.

The updates from the applications 302 (e.g., communicated to the operating system 308) and the image frame updates (e.g., communicated from the operating system 308) may be formatted in any suitable manner so as to be rendered and displayed on a display, such as the display 206. For example, the applications 302 and operating system 308 may format the application updates and image frame updates according to the Open Graphics Library (OpenGL) application programming interface (API) for rendering vector graphics or any other suitable APIs, Software Developer Kits (SDKs), etc. In some implementations, one or more general purpose processors, such as the processors 220 may prepare data, such as vertex attribute data of one or more polygons, based on the updates from the application 302 and according to one or more APIs, such as OpenGL. Then, the general-purpose processors may "bind" this data into one or more programs, such as the shaders 228, executed by the graphics module 308 (e.g., including one or more graphics processing units) to be rendered and displayed on the display 206.

Figure 4:
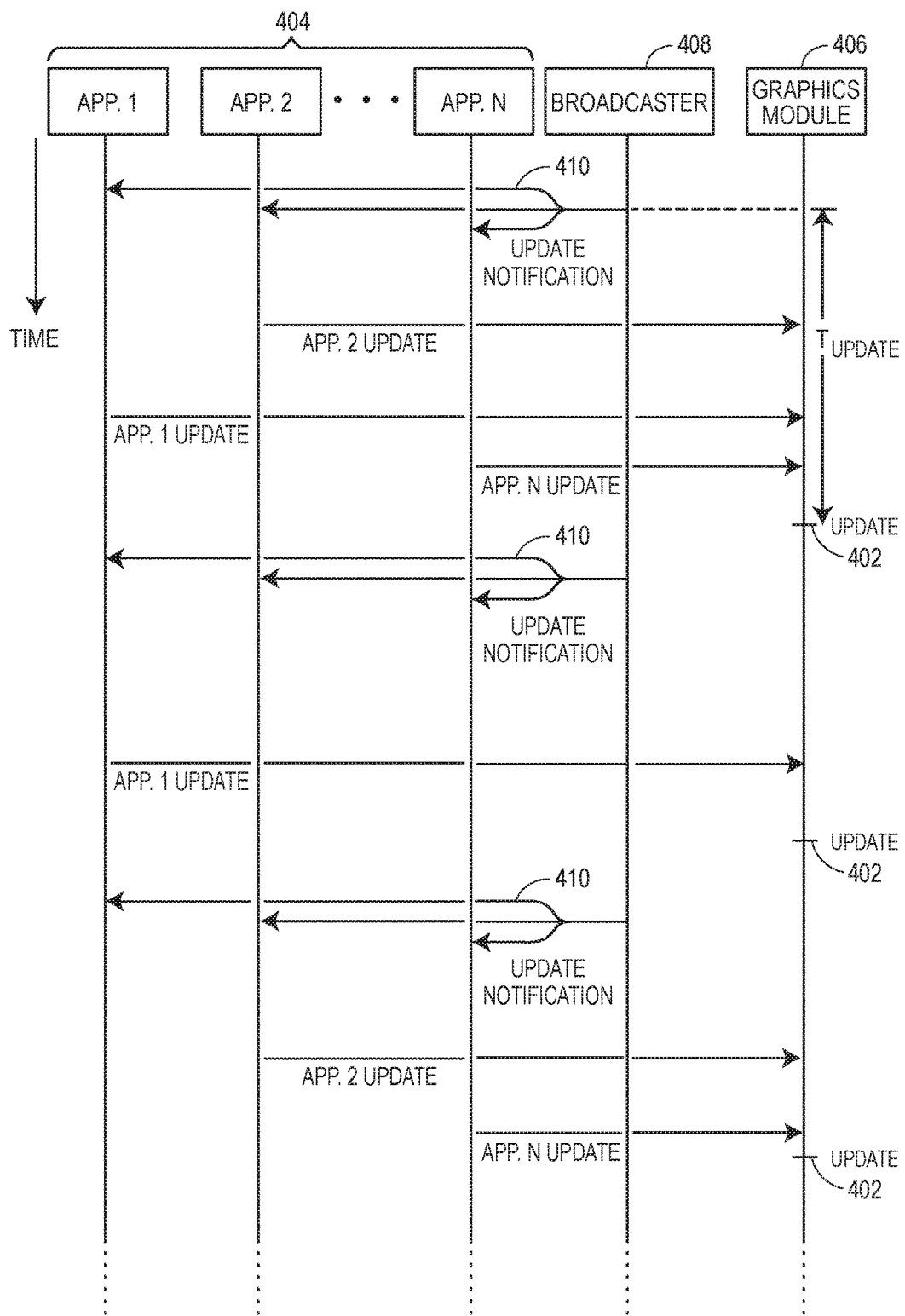
FIG. 4 is a communication flow illustrating another example scheme for updating an image frame displayed on an article, such as the article illustrated in FIG. 1.

FIG. 4 illustrates another example communication flow in which components of an article, such as the article 100, update an image frame displayed on the article at clearly defined time intervals. Similar to the scheme illustrated in FIG. 3, an image frame displayed on a display may only be updated at certain pre-defined, or otherwise defined, times (as illustrated by the marks 402 in FIG. 4). However, to give one or more applications 404 or processes executed on an article or on a connected device the time to compute the next content updates and communicate the updates to an operating system or graphics module 406 before an display update is triggered (e.g., by an operating system), a broadcaster 408 may communicate a notification to the applications 404 indicating a time, "$T_{update}$," until the next image frame update. Such notifications are illustrated in FIG. 4 by arrows 410.

The notifications 410 may be utilized by one or more of the applications 404 as a wake-up notification, thereby maximizing the idle time (sleep, suspend, hibernate, etc) of the main processor and/or other components of an article, such as the article 100. In such cases, the applications 404 may be designed/programmed such that all of the applications 404 are capable generating and communicating new content for display within the time "$T_{update}$." The notification may also allow "$T_{update}$" to be dynamic, in some implementations. For example, a dynamic "$T_{update}$" may be configured by a user and/or an algorithm that adjusts "$T_{update}$" based on registered activities of the applications 404.

Although updates from all of the application 302 and 404 are illustrated in FIGS. 3 and 4, not all of the applications 302 and 404 may generate updated content for display during every time interval between image frame updates. In fact, during a particular time interval between image frame updates, none or only some of the applications 302 and 404 may generate updated content for display and communicate that content to an operating system or graphics module for rendering and display. Applications may only generate updated content in response to certain events, such as newly received or generated data, user interaction, etc., and, as such, applications may only generate updated content during time intervals in which these events occur or that are proximate in time to these events. In the implementations depicted in FIGS. 3 and 4, an operating system or graphics module may still trigger and perform image frame updates every "T" seconds, but as discussed below, image frame updates may only occur when updated application content is received by an operating system/graphics module or generated by one or more applications.

Further, although FIG. 3 illustrates an example communication flow in which the applications 302 generate timed updates for displayed content, certain applications of an article may generate updates at other times. Specifically, applications may generate updates when a user of an article, such as the article 100, interacts with a menu, button, or other interface of the application. In these example cases, the applications 302, or other suitable applications, may generate an update in addition to timed updates. The operating system 308 may provide the additional update to a frame buffer of the graphics module 309 that receives the timed updates, but the operating system 308 may also provide the additional update to a separate frame buffer, such that the additional update is immediately updated on a display.

Figure 5:
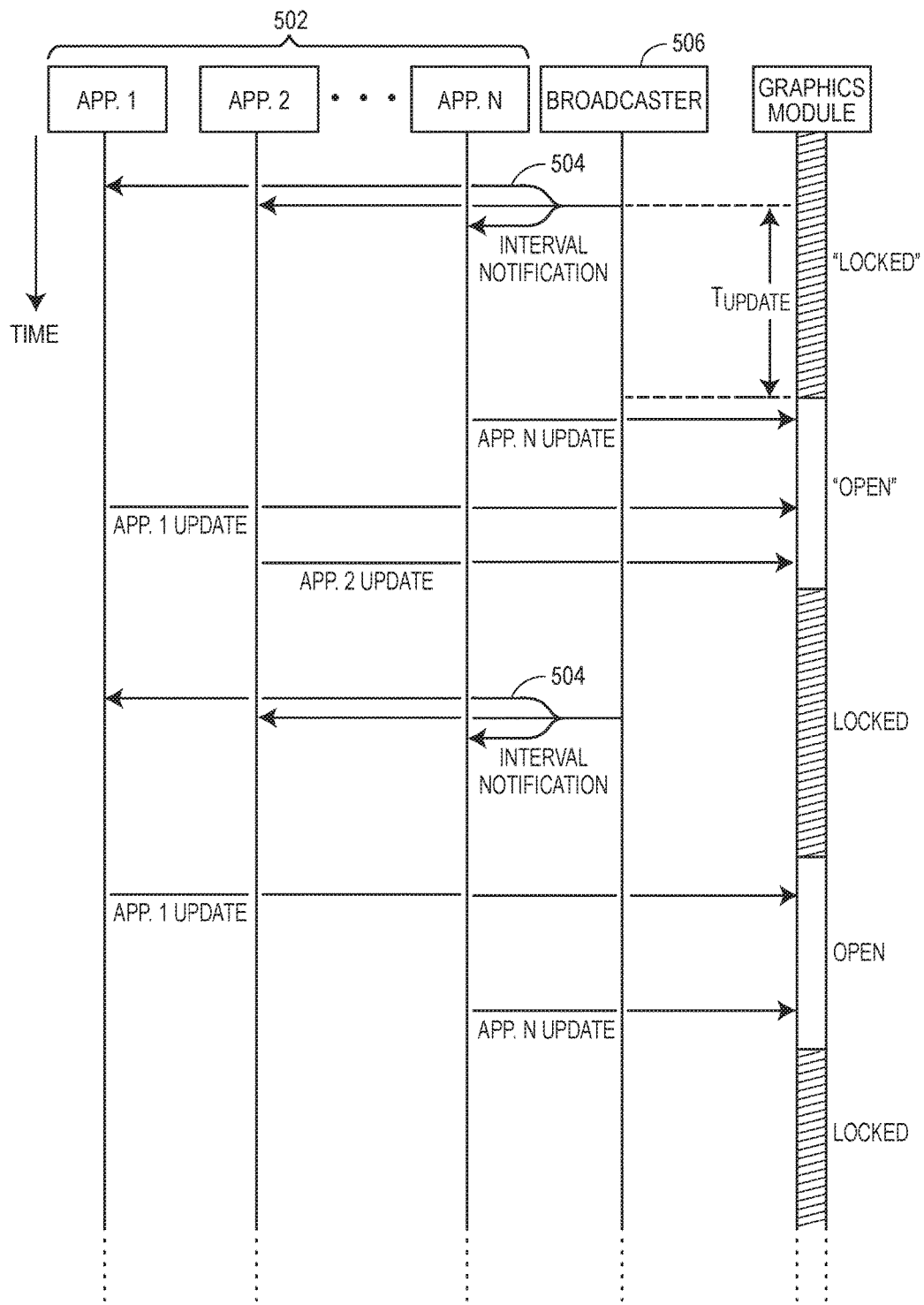
FIG. 5 is a communication flow illustrating yet another example scheme for updating an image frame displayed on an article, such as the article illustrated in FIG. 1.

FIG. 5 illustrates yet another example communication flow in which components of an article, such as the article 100, update an image frame displayed on the article. The communication flow of FIG. 5 also includes a notification similar to the notifications 410 of FIG. 4. However, as opposed to notifying one or more applications 502 of a specific time of an image frame update, one or more notification 504 sent from a broadcaster 506 may notify the applications 502 of one or more time intervals when a graphic module, frame buffer, or other component of a rendering module is "open" to receive updates to displayed content. At time other than the "open" time intervals, a graphics module or other components of a rendering module may be "locked" such that communicating, rendering, and/or displaying updated content is not possible.

Although, some update communications from applications in FIGS. 3, 4, and 5 are illustrated as being communicated to an operating system or broadcaster of an operating system, application may communicate content updates directly to a graphics module and/or further interact with the graphics module to render the content updates. For example, the applications 502 may directly bind data representative of updated content into shaders or other processes of a graphics module such that the content is rendered and a frame buffer is updated with the rendered content.

Figure 6:
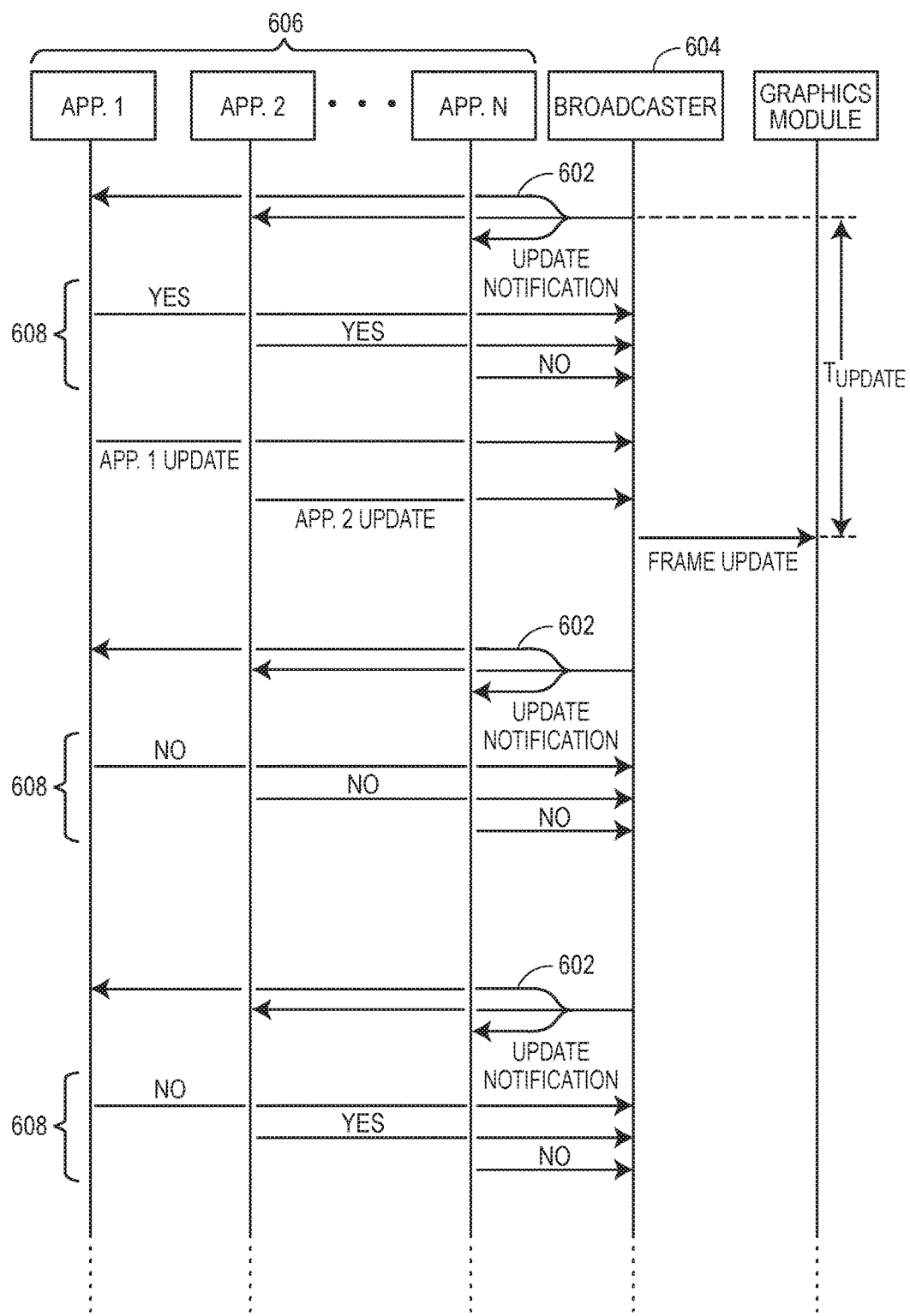
FIG. 6 is a communication flow illustrating yet another example scheme for updating an image frame displayed on an article, such as the article illustrated in FIG. 1.

FIG. 6 illustrates still another example communication flow in which components of an article such as the article 100, update an image frame displayed on the article. In addition to a broadcast of one or more notification 602, as further discussed above, the communication flow illustrated in FIG. 6 includes a "handshake" process. That is, after a broadcaster 604 communicates one of the notifications 602 (e.g., of an upcoming image frame update time or "open" time interval) each of one or more application 606 executing on an article communicate an answer to the notification 602 (as illustrated by the arrows 608 in FIG. 6). The answer may indicate to the broadcaster 604 or another process executing on the article whether each of the applications 606 will generate updated content for display before a next image frame update time. For example, the answers from the applications 606 may include a simple indication of yes or no or any suitable code, symbols, etc. indicative of whether updated content will be generated and communicated for a next image frame update.

In this manner, the broadcaster 604 or other process/module may only trigger image frame update when new content is generated by the applications 606 maximizing or near-optimally controlling the time in which an article, or at least some components of an article, remain in an idle, sleep, low-power, etc. mode. Such a scheme may significantly reduce the draining of a batter power source, such as the battery 202, because during many time intervals (between image frame updates) when all of the applications indicate that no new content is to be displayed and, thus, no image frame update is needed or performed. In some implementations, an operating system or graphics module may only trigger an update to a displayed image frame if at least one application or a pre-defined number of applications positively indicate (e.g., "yes") that new content for display will be generated in a time interval before the update.

Figure 7:
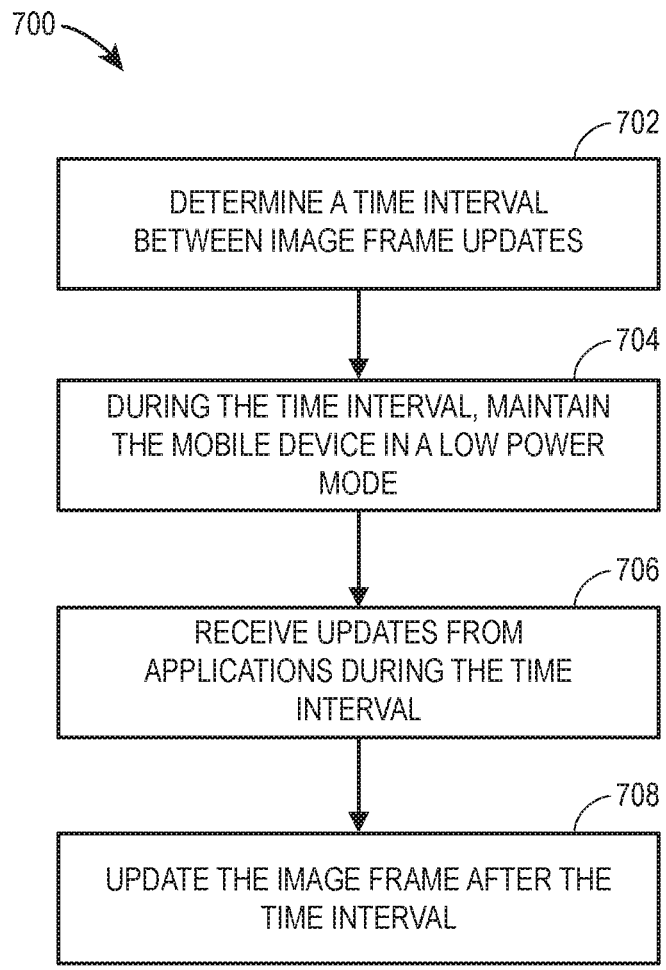
FIG. 7 is a flow chart illustrating an example routine that implements an image updating scheme.

FIG. 7 is a flow diagram of an example method 700 to change/update displayed content while: (i) controlling or minimizing power consumption; (ii) controlling or minimizing a number of content updates during; and/or (iii) clearly defining times at which the displayed content is updated. The method 700 may be implemented by the example article 100, for example.

At block 702, a time interval is determined for a subsequent image update. For example, the operating system 222 may set or define a periodic time interval (e.g., thirty seconds or one minute) and the applications 224 may be programmed or designed so as to produce application content updates at times consistent with the periodic time interval. Generally, however, the time interval between image frame updates need not be periodic. In fact, the operating system 222, or other suitable process, may dynamically adjust a time interval.

In some implementations, the time interval between image frame updates is adaptive such that it is changed (e.g., by the operating system 222) based on certain events. For example, the operating system 222 may shorten the time interval when a high frequency of touch events (or any other user inputs) are detected (e.g., by the touch interface 208). Thus, the display 206 of the article 100 may be temporarily configured to be more "lively" or responsive. On the other hand, when a decrease in the frequency of touch events is detected, the operating system 222 may increase the time interval between image frame updates so as to decrease power consumption, number of updates, etc. As a further example, the interval could be shortened when a high frequency of notifications (emails, text messages, calendar reminders, alarms, etc.) is received or when certain notifications are received (e.g., via the network interface 214), thereby generating attention for the notification.

In another example, a user of an article 100 may increase/decrease a time interval between image updates via user interaction. For example, the article 100 may be configured (e.g., via a graphic user interface of the operating system 222) such that a user may select (e.g., via a tap or other user interaction with the touchscreen interface 208) a low, medium, and high power profile corresponding to a long, medium, and short time interval between image updates. In this manner, a user may manually adjust the power consumption of the article 100. All, or at least some, applications and processes running on the article 100 or on a communicatively connected device may be configured to generate content according to the selectable time intervals, in this scenario. In other implementations, a user may temporarily shorten the time interval by shaking the article 100 (e.g., detect by a sensor such as an accelerometer or a gyroscope) so as to "wake up" the article 100 or make the display more responsive.

Additionally, an operating system 222, or other suitable process, may set or define the time interval to control the amount of image frame updates over a lifetime of an article. In some cases, such a mechanism may be an overriding mechanism (e.g., implemented by an operating system) that governs the total amount of updates over a certain time period (e.g., the total amount of updates over one day or one week). For example, the operating system 222 could automatically scale a moving average amount of updates over the time period. The scaling factor may be a general scaling of an average base time interval between image frame updates, and, thus, the scaling factor may not affect a pre-defined or hardware/software dictated range of time intervals.

For example during a period of higher activity (i.e. smaller intervals between updates) the base interval (i.e. the largest time interval when there is no user activity) could be scaled to be a longer time interval to compensate for the higher number of updates during the high activity period and to make the time interval during the high activity period also longer (when it is a scaling factor of the base time interval). As another example, during a period of higher activity the scaling factor by which the update interval is shortened could be decreased to avoid too many image updates. A combination of these two examples is also possible and could be most effective.

During time intervals, between image updates, an article, such as the article 100, may be maintained in a low-power mode (block 704). For example, the main processor 232 of the article 100 may be in a sleep mode while the co-processor 234 performs any remaining tasks. Also, during the time intervals, updates are received from one or more application (block 706). In some implementations, the functionality of blocks 704 and 706 may occur at separate times. That is, applications may only provide image updates to a graphics module after a notification or after an image buffer of a graphics module is "opened" for writing.

As illustrated in FIGS. 3, 4, 5, and 6, applications may communicate content updates to an operating system or directly to a graphics module. This communication may be governed by a time interval, such as a periodic or dynamically adjusted time interval. Then, an image frame is updated based on the received applications updates (block 708). The updating of the image frame may include binding data into processes of a graphic module, updating a frame buffer, and triggering an update of currently displayed content, in an implementation.

Display Overview

In a general sense, displays of any or all of the embodiments described herein, such as the display 206 may be manufactured as any type of flexible display, such as an e-paper display, an organic light emitting diode (OLED) display, etc. and this flexible display, once manufactured, may then be formed, curved or bent in various manners. Generally speaking, display 206 may be made of two flexible substrates including a backplane flexible substrate and frontplane flexible substrate placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array, or a continuous layer, on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the display 206.

More particularly, the flexible displays illustrated herein, may be manufactured as a flexible display, such as an e-paper display, an organic light emitting diode (OLED) display, etc. Generally speaking, the flexible displays may be constructed on two flexible substrates, or may be constructed on one flexible substrate but having at least two flexible substrates. The flexible substrates may include a backplane display area and frontplane display area placed back to back, next to one another, or laminated onto each other. The frontplane display area may include a continuous layer or an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. Nos. 6,585,914; 6,608,323; 6,991,749; 7,374,702; 7,528,176; 7,569,693; 7,605,225; 7,671,202; 7,816,480; 7,842,198; 7,892,454; 7,893,265; 7,902,363; 7,947,837; 7,982,039; 8,022,214; 8,329,855; 8,404,844; 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, benzocyclobutene-based polymers. Other polymeric dielectrics are described in U.S. Pat. Nos. 7,605,394; 7,981,989; 8,093,588; 8,274,075; 8,338,555; U.S. Patent Publication No. 2011/0175089; U.S. Patent Publication No. 2011/0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. Nos. 8,017,458; 8,097,877; 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (ITO). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. An electric field may be applied to the capsules to bring particles of a selected color to the surface. Electrophoretic media and related display device structures are described in, for example, U.S. Pat. Nos. 5,930,026; 6,831,769; 6,839,158; and 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. Nos. 7,446,945 and 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Figure 8A:
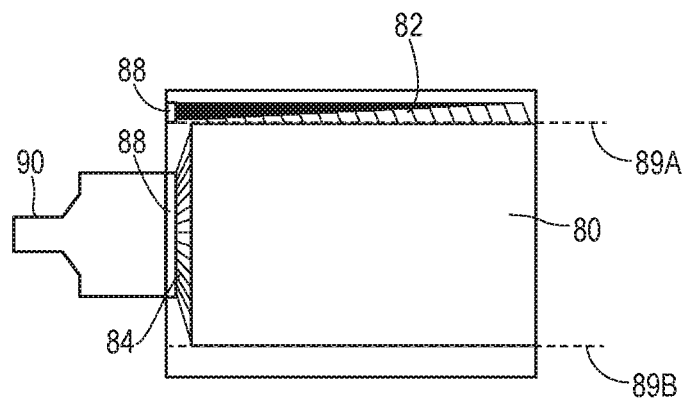
FIGS. 8A, 8B, and 8C illustrate an example display which can be implemented in the article illustrated in FIG. 1.

Moreover, it may be desirable to manufacture the display 206 in a manner that maximizes the amount of the display area space viewable on the top layer of the article 1000. In this regard, FIG. 8A illustrates a base or backplane layer 81 of a display 206 as manufactured. Generally speaking, the backplane of a display 206 comprises a flat surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component or monolithically integrated on top of a backplane component. Both the backplane substrate of the backplane component and the frontplane substrate of the frontplane component are flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 48 may be built in layers, e.g., starting with the backplane and ending with attaching the frontplane substrate.

As illustrated in FIG. 8A, the display area 80 formed on the backplane component 81 of such a display 18 may be generally rectangular in shape and have a large aspect ratio, e.g., an aspect ratio where the length of the display area 80 is at least two times greater than the width of the display area 80, and, in some configurations, is at least five times greater than the width. The display area 80 includes any number of pixels or pixel elements, each of which may be connected to at least two lines (e.g., electrical lines, lead lines, electrodes, connecting lines or connectors) for energization thereof. The electrical lines or connecting lines are disposed at the pixel elements and exit from the display area 80 via various sides of the display area 80. Generally, each line services a particular row or column of pixel elements. As such, in FIG. 8A, the connection lines are illustrated as a first set of connecting lines 82 coming from one of the longitudinal sides and including a line 82 for each of y columns of pixels of the display area 80 (e.g., a set of longitudinal connecting lines), and a second set of connecting lines 84 coming from one of the transverse sides of the display area 80 and including a line 84 for each of x rows of pixels of the display area 80 (e.g., a set of transverse connecting lines). As is known, energization or connection between a particular connecting line 82 of a column yn and a connecting line 84 of a row xm of the display area will energize or turn on that corresponding pixel, and, as such, the corresponding pixel may be referred to using its two-dimensional coordinates, e.g., (xm, yn) or (yn, xm). In any event, as illustrated in FIG. 8A, the sets of connecting lines 82, 84 exit from the display area 80 along the same backplane substrate 81 and are connected to one or more multiplexer or IC driving circuits 88, which may be formed, for example, on or near the edge of the backplane display substrate 81. The driving circuits 88 may be integral with the display driver 48 of the electronic suite 38, or the driving circuits 88 may be disposed separately from but nonetheless communicatively connected to the display driver 48, e.g., the driving circuits 88 are disposed on a flexible connector 90 connecting the backplane layer 81 to the electronics module 19. Typically, the flexible connector 90 is not integral with the backplane layer 81, but instead is a separate element that couples to the backplane layer 81 to communicate with the electronics module 19 and components included therein, such as the display driver 48.

Figure 8B:
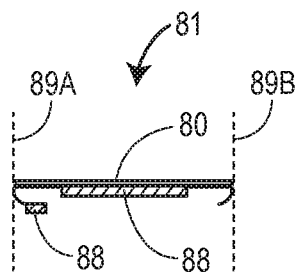

FIG. 8B illustrates a manner of folding or bending the substrate 81 of FIG. 8A, to form a display that includes a maximum amount of display area 80 on the top thereof that is viewable to the user, so as to maximize the amount of area on the band 12 at which the display area 80 is viewable and to minimize the area of edges surrounding the display area 80 that are visible to the user. (For ease of viewing, the flexible connector 90 is not shown in FIGS. 53-54.) In FIG. 8B in particular, the bending may occur along the dotted line 89A, illustrated in FIG. 8A, so as to fold over the backplane sections adjacent to the longitudinal side of the display area 80 at which the connecting lines 82 are disposed. This folding enables the connecting lines 82 to be bent down and under the display area 80, and enables the multiplexer or IC driving circuits 88 to be connected to the display driver 48 (disposed in, for example, one of electronics module 19 not shown in FIGS. 18 and 19) via separate electronics or electrical connections. Thus, as illustrated in FIG. 8B, which depicts a cross-sectional end view of the display 206, the display 206 so formed and bent enables the separate longitudinal display lines 82 to be connected to different multiplexer or driving IC circuits 88, which are ultimately connected to the display driver 48 of FIG. 48, in order to energize the rows and columns of pixel elements of the display 206 to thereby drive the display 18. As the fold 89A occurs along the edge of the display area 80, the areas of the backplane substrate of the display 206 that are used to form the connecting lines 82 are disposed in a different plane than, and are disposed in some cases under the display area 80, and thus do not require the backplane substrate 81 to extend out towards the sides of the band 12 much beyond the edges of the display area 80. This configuration, in turn, enables the maximal amount of viewable display area to be disposed on the top portion of the band 12 which maximizes the viewable or usable area of the band 12 at which the display 18 can present viewable images. In some embodiments, the backplane substrate 81 may also be bent along the dotted line 89B along the opposite longitudinal side, even if the opposite longitudinal side does not support any electrodes or connectors thereon, e.g., for ease of manufacturing and/or for aesthetic considerations.

Figure 8C:
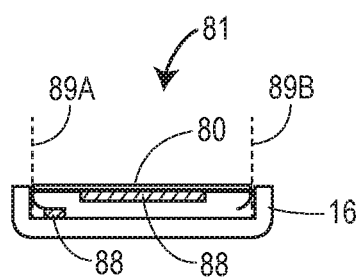

FIG. 8C illustrates a cross-sectional view of the display 18 bent as illustrated in FIG. 8B and disposed in or on a flexible support 16 of the band 12, with the display 18 having the maximal display area 80 thereon disposed up to the edges of the band of the article 100. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible, attachable article or article 100.

In some cases (for example, due to the size of the display area 80, the material composition of the display 206, etc.), bending the backplane layer 81 so that the electrodes or connectors 82 are under the display area 80 may cause undesirable effects, such as interference between various electrical components of the backplane layer 81. Further, in order for the display 206 to be as dynamically flexible as possible, the impact of the more rigid portions of the backplane layer 81 (e.g., the portions which support the less-flexible or rigid driving circuits 88) on the flexibility of the display area 80 is desired to be minimized. Still further, a minimum border extending from the display area 80 and viewable to a user may be necessary to seal the top and bottom layers of the display 206, e.g., by using an environmental barrier material for the frontplane and backplane substrates and the seal, or by some other means. In electrophoretic displays, for instance, the required width of a border for sealing is typically around 2 to 6 mm.

Additional Considerations

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for updating displayed content as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:

1. A computer-implemented method for updating images displayed on an electronic display of a mobile device, the method comprising:

determining, by one or more processors, a time interval between successive updates of an image frame, wherein the image frame is displayed on the electronic display, and wherein the mobile device is configured to be in a low power mode between the successive updates;

communicating, to a plurality of applications executing on the one or more processors, a notification indicative of whether a rendering module of the mobile device is or is not available to receive one or more application updates within the time interval;

wherein when the notification indicates that the rendering module is available to receive the one or more application updates within the time interval, receiving, from the plurality of applications executing on the one or more processors, the one or more application updates within the time interval; updating, by the one or more processors, the image frame after the time interval based on the one or more application updates; returning the mobile device to the low power mode after updating the image frame; and when the mobile device is in the low power mode, displaying the updated image frame on the electronic display; and wherein when the notification indicates that the rendering module is not available to receive the one or more application updates within the time interval, not receiving the one or more application updates within the time interval and not updating, by the one or more processors, the image frame after the time interval.

2. The computer-implemented method of claim 1, wherein determining the time interval includes determining a periodic time interval, and wherein the plurality of applications are configured to communicate the one or more application updates periodically according to the periodic time interval.

3. The computer-implemented method of claim 2, further comprising aggregating, by the one or more processors, the one or more application updates received during the time interval into an aggregated frame update, wherein updating the image frame after the time interval includes updating the image frame based on the aggregated frame update.

4. The computer-implemented method of claim 1, further comprising communicating, to the plurality of applications, an indication of a time remaining until the next of the successive updates of the image frame, wherein the one or more application updates are received during the time remaining until the next of the successive updates of the image frame.

5. The computer-implemented method of claim 4, further comprising, in response to the communicated indication of the time remaining until the next of the successive updates of the image frame, receiving, from each of the plurality of applications, an indication of whether the respective application will generate one of the one or more application updates.

6. The computer-implemented method of claim 1, wherein the time interval is a first time interval, the method further comprising communicating, to the plurality of applications, an indication of a second time interval before the next of the successive updates of the image frame during which the rendering module is available to receive the one or more application updates, wherein the one or more application updates are received during the second time interval.

7. The computer-implemented method of claim 1, wherein determining the time interval between the successive updates of the image frame includes:
   receiving, via a user interface of the mobile device, a selection of one of a plurality of power profiles, and
   determining the time interval based on the selected one of the plurality of power profiles.

8. The computer-implemented method of claim 1, further comprising detecting, by the one or more processors, a frequency of touch events on a touch interface of the mobile device, wherein determining the time interval between the successive updates of the image frame includes determining the time interval based on the frequency of touch events.

9. The computer-implemented method of claim 1, further comprising detecting, via one or more motion sensors of the mobile device, a particular user interaction with the mobile device, wherein determining the time interval between the successive updates of the image frame includes determining the time interval based on the particular user interaction.

10. The computer-implemented method of claim 1, detecting, by the one or more processors, an activity level of at least one of a user of the mobile device or one or more of the plurality of applications, wherein determining the time interval between the successive updates of the image frame includes determining the time interval based on the activity level.

11. The computer-implemented method of claim 10, wherein determining the time interval based on the activity level includes at least one of:
   increasing a previously determined time interval based on an increase in the activity level, or
   decreasing a previously determined time interval based on a decrease in the activity level.

12. The computer-implemented method of claim 1, wherein determining the time interval between the successive updates of the image frame includes determining the time interval so as to regulate the number of updates to the image frame over the lifetime of the electronic display.

13. A non-transitory computer-readable medium storing thereon instructions that, when executed on one or more processors of a computing device, cause the one or more processors to:
   determine a time interval between successive updates of an image frame,
   wherein the image frame is displayed on an electronic display of a mobile device, and
   wherein the mobile device is configured to be in a low power mode between the successive updates;
   communicate, to a plurality of applications executing on the one or more processors, a notification indicative of whether a rendering module of the computing device is or is not available to receive one or more application updates within the time interval;
   wherein when the notification indicates that the rendering module is available to receive the one or more application updates within the time interval, receive, from the plurality of applications executing on the one or more processors, the one or more application updates within the time interval; update the image frame after the time interval based on the one or more application updates; return the mobile device to the low power mode after updating the image frame; and when the mobile device is in the low power mode, display the updated image frame on the electronic display; and
   wherein when the notification indicates that the rendering module is not available to receive the one or more application updates within the time interval, not receive the one or more application updates within the time interval and not update the image frame after the time interval.

14. The non-transitory computer-readable medium of claim 13, wherein the time interval is a periodic time interval, and wherein the plurality of applications are configured to communicate the one or more application updates periodically according to the periodic time interval.

15. The non-transitory computer-readable medium of claim 14, wherein the instructions further cause the one or more processors to aggregate the one or more application updates into an aggregated frame update, wherein updating the image frame after the time interval includes updating the image frame based on the aggregated frame update.

16. The non-transitory computer-readable medium of claim 13, wherein the instructions further cause the one or more processors to communicate, to the plurality of applications, an indication of a time remaining until the next of the successive updates of the image frame, wherein the one or more application updates are received during the time remaining until the next of the successive updates of the image frame.

17. The non-transitory computer-readable medium of claim 16, wherein the instructions further cause the one or more processors to, in response to the communicated indication of the time remaining until the next of the successive updates of the image frame, receiving, from each of the plurality of applications, an indication of whether the respective application will generate one of the one or more application updates.

18. A computing device comprising:
   a rendering module; and
   a non-transitory computer-readable memory storing thereon instructions that, when executed by the rendering module, cause the computing device to:
   determine a time interval between successive updates of an image frame,
   wherein the image frame is displayed on an electronic display of a mobile device, and
   wherein the mobile device is configured to be in a low power mode between the successive updates,
   communicate, to a plurality of applications executing on the rendering module, a notification indicative of whether the rendering module is or is not available to receive one or more application updates within the time interval;
   wherein when the notification indicates that the rendering module is available to receive the one or more application updates within the time interval, receive, from the plurality of applications executing on the rendering module, the one or more application updates within the time interval; update the image frame after the time interval based on the one or more application updates; return the mobile device to the low power mode after updating the image frame; and when the mobile device is in the low power mode, display the updated image frame on the electronic display; and
   wherein when the notification indicates that the rendering module is not available to receive the one or more application updates within the time interval, not receive the one or more application updates within the time interval and not update the image frame after the time interval.

19. The computing device of claim 18, wherein the instructions further cause the computing device to detect a frequency of touch events on a touch interface of the mobile device, wherein determining the time interval between the successive updates of the image frame includes determining the time interval based on the frequency of touch events.

20. The computing device of claim 18, wherein the instructions further cause the computing device to detect, via one or more motion sensors, a particular user interaction with the mobile device, wherein determining the time interval between the successive updates of the image frame includes determining the time interval based on the particular user interaction.

\* \* \* \* \*